US008488541B2

(12) United States Patent
Schlack

(10) Patent No.: US 8,488,541 B2
(45) Date of Patent: Jul. 16, 2013

(54) PORTABLE TRANSCEIVER DEVICE THAT OPERATES AS A GATEWAY TO A PROPRIETARY WIRELESS NETWORK

(76) Inventor: Scott Allen Schlack, Lynnwood, WA (US)

( * ) Notice: Subject to any disclaimer, the term of this patent is extended or adjusted under 35 U.S.C. 154(b) by 311 days.

(21) Appl. No.: 12/910,781

(22) Filed: Oct. 22, 2010

(65) Prior Publication Data
US 2011/0096726 A1 Apr. 28, 2011

Related U.S. Application Data

(60) Provisional application No. 61/253,920, filed on Oct. 22, 2009.

(51) Int. Cl.
H04W 4/00 (2009.01)
(52) U.S. Cl.
USPC ............................ 370/329; 370/338; 370/341
(58) Field of Classification Search
None
See application file for complete search history.

(56) References Cited

U.S. PATENT DOCUMENTS

2004/0014497 A1* 1/2004 Tjalldin et al. ............... 455/558
2004/0196810 A1* 10/2004 Kil et al. ...................... 370/331
2006/0133414 A1* 6/2006 Luoma et al. ................ 370/466
2006/0182061 A1* 8/2006 Naghian ....................... 370/331
2009/0007246 A1* 1/2009 Gutowski et al. ................ 726/6
2009/0227230 A1* 9/2009 Camilleri et al. ............. 455/408
2010/0138661 A1* 6/2010 Tsai et al. ..................... 713/171
2010/0205435 A1* 8/2010 Xie .............................. 713/168
2010/0245077 A1* 9/2010 Shmueli et al. ............ 340/539.1
2011/0216744 A1* 9/2011 Taaghol et al. ............... 370/332

* cited by examiner

Primary Examiner — Chi Pham
Assistant Examiner — Soon-Dong D Hyun

(57) ABSTRACT

A portable gateway device facilitating shared access to a proprietary wireless network. The portable gateway device acts as an external modem for one or more auxiliary personal computing devices, and the device includes: a local power supply, one or more processors, one or more memories, an identification module associated with a proprietary wireless network, a first wireless communications component, and a second wireless communications component having longer range communications capability than the first wireless communications component. The portable gateway device is configured to facilitate one or more external computing device accessing the proprietary wireless network by: establishing communications with a first external computing device using the first wireless communications component, authenticating access with the proprietary wireless network using the second wireless communications component, and subsequently relaying communications between the first external computing device and the proprietary wireless network using both the first and the second wireless communications components.

18 Claims, 12 Drawing Sheets

PORTABLE TRANSCEIVER DEVICE THAT OPERATES AS A GATEWAY TO A PROPRIETARY WIRELESS NETWORK

CROSS REFERENCE TO RELATED APPLICATIONS

The present application claims the benefit of U.S. Provisional Application No. 61/253,920, filed Oct. 22, 2009, and incorporated herein by reference.

FIELD OF THE INVENTION

The present invention generally relates to a portable transceiver device that can facilitate one or more local computing devices accessing the same subscriber-based network by sharing and/or switching access privileges.

BACKGROUND OF THE INVENTION

With the increasing popularity of modern data communications devices, also referred to herein as personal computing devices (PCDs), such as cellular phones, personal desktop assistants (PDAs), tablet computers, netbook computers, laptop computers, electronic book devices, media player devices, video-gaming units, digital cameras, video recorders, etc., many consumers are creating a high demand for new technologies that enhance the mobility and flexibility of wireless services that facilitate network communications for their PCDs. Only a minority of consumers today is able to replace their wireless-capable PCDs (e.g., their cell phone or tablet computing devices) every time a new or more popular device model (having improved features and functionality) becomes available. Most consumers prefer to simply upgrade or enhance their existing PCDs for a period of time, by updating operating system firmware, adding new software applications, and/or purchasing auxiliary compatible aftermarket hardware components, such as: external or plug-in memory components, wireless modems, media card readers, GPS units, auxiliary microphone and/or speaker devices, webcams, etc.

One relatively new technology that some consumers utilize to enhance the data communications capability of their existing PCDs is known in the Art as device "tethering." By way of example, the Apple® iPhone™ (e.g., 112*b* of FIG. 1), as well as many Google® Android™ based phones (e.g., Motorolla®, HTC®, or Samsung® phones running the Android® operating system), have been advertised to have tethering software and functionality that enables these devices to act as a data communications modem and/or gateway for a separate PCD, such as a laptop computer (e.g., 112*a* of FIG. 1). In a scenario where a user of a PCD is lacking access to the Internet via a wireless network service (e.g., a cellular or a WiMAX network), a phone (having such network access) can be tethered or otherwise coupled to the PCD to allow the PCD to gain access to the cell phone user's subscribed network service (e.g., a subscribed cellular service provided by AT&T®, Sprint®, Verizon®, T-Mobile®, etc.).

As would be understood by those skilled in the art, tethering generally facilitates a first stand-alone computing device (e.g., a laptop or mini-computer), not having a desired network access at a particular time or location, to utilize a second stand-alone computing device (e.g., a cellular phone or PDA having a desired network service) as an external modem and/or gateway to provide the PCD with linked access to the desired network services (e.g., broadband access to the Internet). In this scenario, a tethered device (See e.g., cellular phone 112*b*) acts as a burdened, slave device for a master tetheree device (See e.g., laptop computer 112*a*). As would be understood by those skilled in the art, a master-slave model in data communications occurs when a master, controller device or process has unidirectional control over one or more slave device components. Generally, a tethered (slave) device is not designed to function independently of a tetheree (or master) device, while the two devices are paired in a routed data communications session. This is due to the fact that a significant amount of the tethered device's data processing and communications capability, along with its power and memory resources, are actively being consumed to facilitate the tetheree device's communications to a proprietary network service that is associated with the tethered device. In most scenarios, the tethered device's user interface is not accessible or practically available to its user during tethering, nor is its communications functionality.

Tethering scenarios that facilitate sharing access to a subscriber-based proprietary network typically require utilization of a subscriber identification module (SIM), or some other imbedded identity module, to authenticate the identity of a network service subscriber attempting to access the proprietary network. In other scenarios, tethering may not require use of a subscriber's SIM to access other types of data communications networks (e.g., some public Wireless Local Area Networks or WLANs). By way of example, if a user's PCD is not equipped with a transceiver allowing the PCD to access a public WiFi™ network (e.g., broadband access to the Internet not requiring secure account authentication), the PCD may be tethered to a cellular phone or PDA having a WiFi™ transceiver, to allow the PCD to access the public WiFi™ network.

Several deficiencies exist with modern tethering scenarios (See e.g., the tethering configuration between the tetheree laptop 112*a* and the tethered cell phone or PDA 112*b* of FIG. 1). A few of these deficiencies include, but are not limited to, the following:

1) a tethered device (the device acting as a modem and/or gateway for another device 112*b*) is typically not separately functional during the period of time when it is being used as an external modem (when it is in a "tethering mode"); if the device is functional, it will be significantly burdened by the tethering functions occurring in the background, and normal application processing and networking functions may be temporarily burdened to the point where they become impractical;

2) a tethered device 112*b*, acting as a connected dongle, is often bulky and awkward to keep connected by wireline coupling to a tetheree PCD 112*a* (the device using the tethered device as an external modem);

3) tethering network access authentication sessions generally require continuous use of the tethered device's 112*b* processor in order to facilitate access to internal subscriber authentication information and routed data communications between a tetheree device 112*a* and a network, thereby consuming the tethered device's 112*b* resources (e.g., battery power, processing power, available volatile memory, etc.) and limiting an available data transfer rate for the tethered device;

4) a tethered device 112*b*, such as cellular phone or a PDA, often has inadequate battery life to provide sufficient periods of wireless tethered communications along with the device's primary functions as a stand-alone computing device; this may require the device to be charged multiple times during the same day, thereby reducing or otherwise crippling its extended mobility;

5) a tethered device 112*b* is susceptible to unwanted computer viruses as well as other malware uploads from afflicted tetheree PCDs 112*a* (or vice versa) when the two devices are connected in networked communications; and 6) private and personal information resident on a tethered device 112*b* can be accessed or corrupted by or through a tetheree device 112*a* or a third party device 104*a* connected to the tetheree PCD via a network (e.g., over the Internet) 102 when the devices are linked during a tethered communications process.

In a tethering scenario, a tetheree (e.g., a PCD such as a laptop, tablet computer or an electronic book device) can be connected to a proprietary network service by using a tethered device (e.g., a device such as a cellular phone or a PDA) as a gateway. Generally the tethered device provides the tetheree with temporary access to its network service account by facilitating network subscriber authentication while communicating with the tethered device's service provider. For many service providers in the United States and abroad, network subscriber authentication is facilitated when a service provider verifies information contained on a subscriber resident device's identification module or SIM card.

As would be understood by those skilled in the art, SIM cards are smart cards that may be configured to fit inside a mobile computing device (e.g., securely under a removable battery component), such as a cellular phone or a PDA device. In other devices identity modules or SIM cards may be built into the hardware memory of the device, such that the identification module is specifically designed not to be separated from the communications device as a detachable unit. Identity modules and SIM cards can provide for the identification of a subscribed user to a network access provider, allowing the user to access services and data that may include, but are not limited to, telephony, email, text messaging, Internet usage, GPS, etc.

An identity module, or a SIM card, generally includes a microprocessor unit as well as on-chip memory to process commands and to store user data, such as contacts and a limited amount of media content, and to store the SIM card's operating instructions. As would be understood by those skilled in the Art, identity modules and SIM cards also provide network specific information used to identify and authenticate subscribers of a cellular network service, including, but not limited to, at least the following information: an Integrated Circuit Card ID (ICC-ID), an International Mobile Subscriber Identity (IMSI), an Authentication Key (Ki), and a Local Area Identity (LAI).

Each identity module or SIM can be internationally identified by an ICC-ID stored in the module's memory and optionally engraved or printed on a physical SIM card's exterior. The ICC-ID is defined by the ITU-T recommendation and is generally up to 19 or 20 digits long. Identity modules and SIM cards may also be identified on their individual service provider networks by holding unique IMSIs. An IMSI is a unique number that is associated with all GSM, UMTS, LTE, LTE Advanced, etc. network mobile phone users. An International Mobile Subscriber Identity is up to 15 digits long. The first three digits represent the country code, followed by the network code. The remaining digits, up to fifteen, represent the unique subscriber number from within the network's customer base.

An identity module's or a SIM's authentication key (Ki) is generally a 128-bit value used in authenticating the users of a proprietary network. Each SIM holds a unique Ki assigned to it by a service provider during a SIM registration process. The Ki is also stored on a database (e.g., an authentication Center or AuC) within the service provider's network infrastructure. Generally, an identity module or SIM card does not allow a particular Ki to be obtained using the smart-card interface. Instead, the SIM card can provide a specialized function that allows a PCD to pass data to the card to be signed with the Ki. This makes usage of the SIM card mandatory unless the Ki can be extracted from the SIM card, or a service provider is willing to reveal or duplicate a Ki. In practice, most service providers prefer to keep only one copy of a particular Ki per customer account so that duplicate and/or separate SIM cards would need to be purchased by the customer to facilitate multi subscriber account access.

A subscriber authentication process may include a subscriber PCD (having an identity module or SIM card therein) powering on and then obtaining the IMSI from SIM card memory. The subscriber PCD then passes the IMSI to its registered service provider that is requesting access authentication. The subscriber PCD may further be required to pass a personal identification number (PIN) to the SIM card before the SIM card will reveal the IMSI information to the service provider.

After receiving the IMSI, the service provider searches its database for the incoming IMSI's associated Ki. The service provider then generates a Random Number (RAND, a nonce that is used only once) and signs it with the Ki associated with the IMSI (and stored on the SIM card), computing another number known as Signed Response 1 (SRES1). The service provider then sends the RAND to the PCD, which passes it to the identity module or SIM card. The identity module of SIM card signs it with its Ki, producing SRES2, which it subsequently returns to the PCD, along with encryption key Kc. The subscriber's PCD passes SRES2 on to the service provider via the network. The service provider then compares its computed SRES1 with the received computed SRES2. If the two numbers match, the SIM is authenticated and the PCD is granted access to the service provider's network. Subsequently, the Kc may be utilized to encrypt all further communications between the subscriber PCD and the service provider network.

A common scenario may exists where a first stand-alone PCD with WiFi™ communications capability is not in proximity to a free public WiFi™ access point. For example, this may occur when a user in an automobile, at an airport, staying in a hotel, etc. In these scenarios, a user may only have access to a proprietary WiFi™ or WiMAX™ network that requires them to pay exorbitant hourly or day-use fees to access the private network. In other scenarios, access to a wireless local access network, or WLAN, may simply be unavailable at a PCD's present location.

To remedy these scenarios some service providers offer device-specific plug-in cellular transceiver/antenna components (e.g., USB transceiver 110*b* or PCI card transceiver 114*b* of FIG. 1) that have a service subscriber's identification and account access data built into the plug-in device, such that a subscriber is capable of purchasing this additional access device and associated service to access a proprietary network (e.g., a cellular broadband network) using the additional service provider device. These additional plug-in devices can provide an individual network user's PCD with cellular broadband access in accordance with varying access provider specific data-rate plans, which may be separate from an existing customer's cellular phone or PDA data rate plan. Generally, a customer with a cellular telephone or a PDA pays fees for both their cellular phone network data access and their additional PCD modem's network data access as a separate monthly or annual subscriber fees.

FIG. 1 depicts one example of a modern distributed computing system 100 where several subscriber devices 108*a-c*, 110*a*, 112*a*, and 114*a* can independently access a service provider's network using various internal (e.g., those associated with cell phones 108a-c) and external communications transceivers (e.g., any of proprietary transceiver devices 110b, 112b, and 114b). The modern distributed computing system 100 may include, but is not limited to: a data communications network 102 (e.g., including WANs, LANs and backhaul network components), various distributed server devices 104a-c (e.g., associated with various control centers/devices, switching centers, Internet servers, proxy servers, etc.), various cellular network base stations 106a-b, various stand-alone personal communications devices 108a-c (e.g., cellular phones or PDAs having internal subscriber SIMs and subscriber network transceivers), as well as various tethered personal computing devices 110a, 112a, and 114a (e.g., tablet computers, e-book devices, and laptop or netbook computers) that are connected to various tethered devices, including, USB-connected transceivers 110b, cellular phone (tethering) transceivers 112b, and PCI card or laptop plug-in transceivers 114b.

FIG. 2 depicts one example of a modern Multi-Function Computing Device (MFCD) 200 (e.g., such as a cellular phone or a PDA device) having at least the following components: a central processing unit/digital signal processor 202, a transcoder 204, a system memory 206 including both volatile (RAM) and nonvolatile (ROM) memory components, a user interface/display 208, a smart card/smart card reader 210, a universal serial bus (USB) 212, a flash drive memory component 214, a rechargeable DC power supply 216, a WiFi™ transceiver 218, a Bluetooth™ transceiver 220, a GPS transceiver 222, a cellular network transceiver 224, an audio amplifier 226, a speaker 228, a microphone 230, a MEMS unit 232, and a system bus 234.

The MFCD 200 may include one or more different communications transceivers (e.g., WiFi™ 218, Bluetooth™ 220, GPS 222, and Cellular 224 transceivers) for communicating over both Local Area Networks (e.g., LANs, including WiFi™ enabled networks) and Wide Area Networks (e.g., WANs, including cellular and satellite communications networks). In order for the MFCD 200 to access a proprietary cellular communications network that can provide for both digital telephony and Internet data access to the Internet, the MFCD 200 will typically be required to provide subscriber identity information to authenticate access with a local network service provider. This authenticated access (the process of which is described above) generally requires communication between a network service provider (e.g., authentication with either network base station 106a or 106-b of FIG. 1) and the MFCD's 200 internal SIM card 210.

Even with the advent of modern tethering technologies, most network subscribers (with a single network service account) have only one SIM card within their MFCD 200. This single SIM card may only provide for subscriber account access with a single protected SIM authentication key (Ki). As such, these subscribers are only able to utilize one PCD at a time to access their network subscriber account. Switching their single SIM card between devices (only possible when both PCDs have SIM readers, such as a pair of cellular phones) is often cumbersome and time-consuming. Further, modern tethered standalone transceiver devices heavily burden and/or incapacitate a tethered device (the device acting as a modem) in order to connect a tetheree device to a proprietary communication network. Therefore it would be beneficial to have a truly portable SIM transceiver device that was physically and functionally separate or optionally separable from a user's PCD. It would also be advantageous if this portable SIM transceiver could facilitate shared access and easy switching amongst multiple subscriber devices without burdening functionality and/or resources of any of a user's standalone PCDs. It would also be beneficial if this transceiver device could be alternately adapted to facilitate shared access to a proprietary WiFi™, WiMAX™, and/or Cellular communications network.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with modern wireless data communications system devices and methods that facilitate proprietary network service access for mobile user equipment, the portable gateway device of the present invention facilitates shared access the same subscriber-based network for one or more communicating personal computing devices. In an embodiment, the portable gateway device includes: a local power supply, one or more processors, one or more memories, an identification module associated with a proprietary wireless network, a first wireless communications component, and a second wireless communications component having longer range communications capability than the first wireless communications component. The portable gateway device facilitates shared access to a proprietary wireless network by: establishing communications with a first external computing device using the first wireless communications component, authenticating access with the proprietary wireless network using the second wireless communications component, and subsequently relaying communications between the first external computing device and the proprietary wireless network using both the first and the second wireless communications components.

In accordance with another aspect of the present invention, the second wireless communications component has WiMAX communications capability and the first wireless communications component has WiFi or Bluetooth communications capability.

In accordance with yet another aspect of the present invention, the portable gateway device facilitates a second external computing device accessing the proprietary wireless network at the same time the first external computing device has access to the proprietary wireless network.

In accordance with another a further aspect of the present invention, the portable gateway device can facilitate simultaneous data transfers for the first and second external computing devices by allocating available bandwidth access with the proprietary wireless network to the first and second external computing devices equally.

In accordance with yet a further aspect of the present invention, the portable gateway device can facilitate simultaneous data transfers for the first and second external computing devices by allocating available bandwidth access with the proprietary wireless network to the first and second external computing devices in accordance with a predefined set of data transfer prioritization rules.

In accordance with another aspect of the present invention, the portable gateway device authenticates access for the first external computing device before the proprietary wireless network authenticates access for the portable gateway device.

In accordance with yet another aspect of the present invention, a user of the first external computing device who is registered as the owner of the portable gateway device is prompted prior to allowing the second external computing device shared access to the proprietary wireless network. This allows the owner to control access privileges affiliated with their proprietary wireless network account.

In accordance with a further aspect of the present invention is a computer-readable medium encoded with computer-executable instructions that facilitate shared access to a proprietary wireless communications network. When executed following processes are performed: initiating a portable gateway device comprising and identification module associated with a proprietary wireless network, establishing communications between a first external computing device and the portable gateway device using a first wireless communications component of the portable gateway device, authenticating access to the proprietary wireless network with a second wireless communications component of the portable gateway device that has longer range communications capability than the first wireless communications component, and then relaying communications between the first external computing device and the proprietary wireless network using both the first and the second wireless communications components.

In accordance with yet a further aspect of the present invention is a computer implemented method that facilitate shared access to a proprietary wireless communications network, the method including the following processes: initiating a portable gateway device comprising and identification module associated with a proprietary wireless network, establishing communications between a first external computing device and the portable gateway device using a first wireless communications component of the portable gateway device, authenticating access to the proprietary wireless network with a second wireless communications component of the portable gateway device that has longer range communications capability than the first wireless communications component, and then relaying communications between the first external computing device and the proprietary wireless network using both the first and the second wireless communications components.

BRIEF DESCRIPTION OF THE DRAWINGS

Exemplary and alternative examples of the present invention are described in detail below with reference to the following Figure drawings.

DETAILED DESCRIPTION

Figure 1:
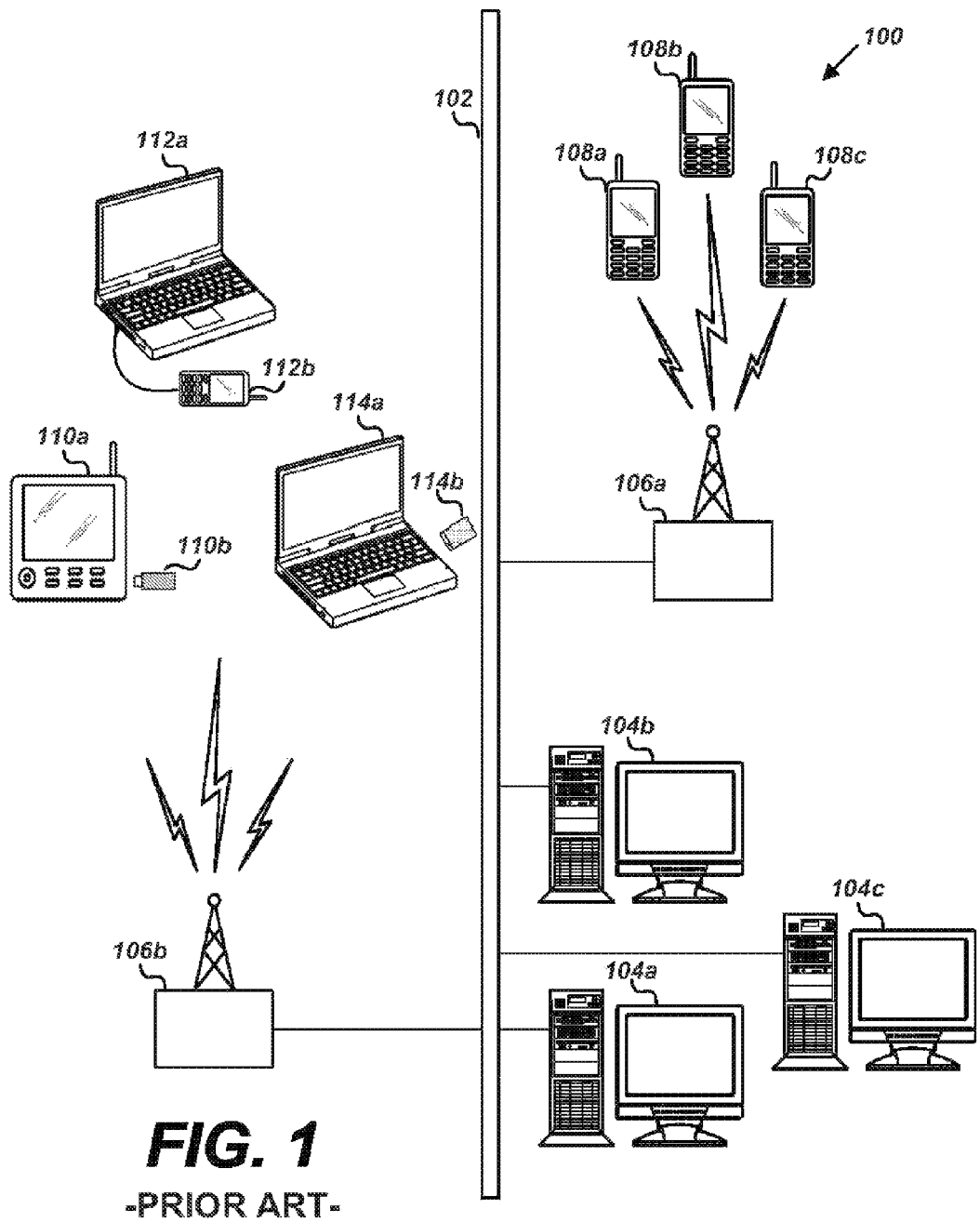
FIG. 1 illustrates a perspective view of a distributed computing system associated with the Prior Art.
Figure 2:
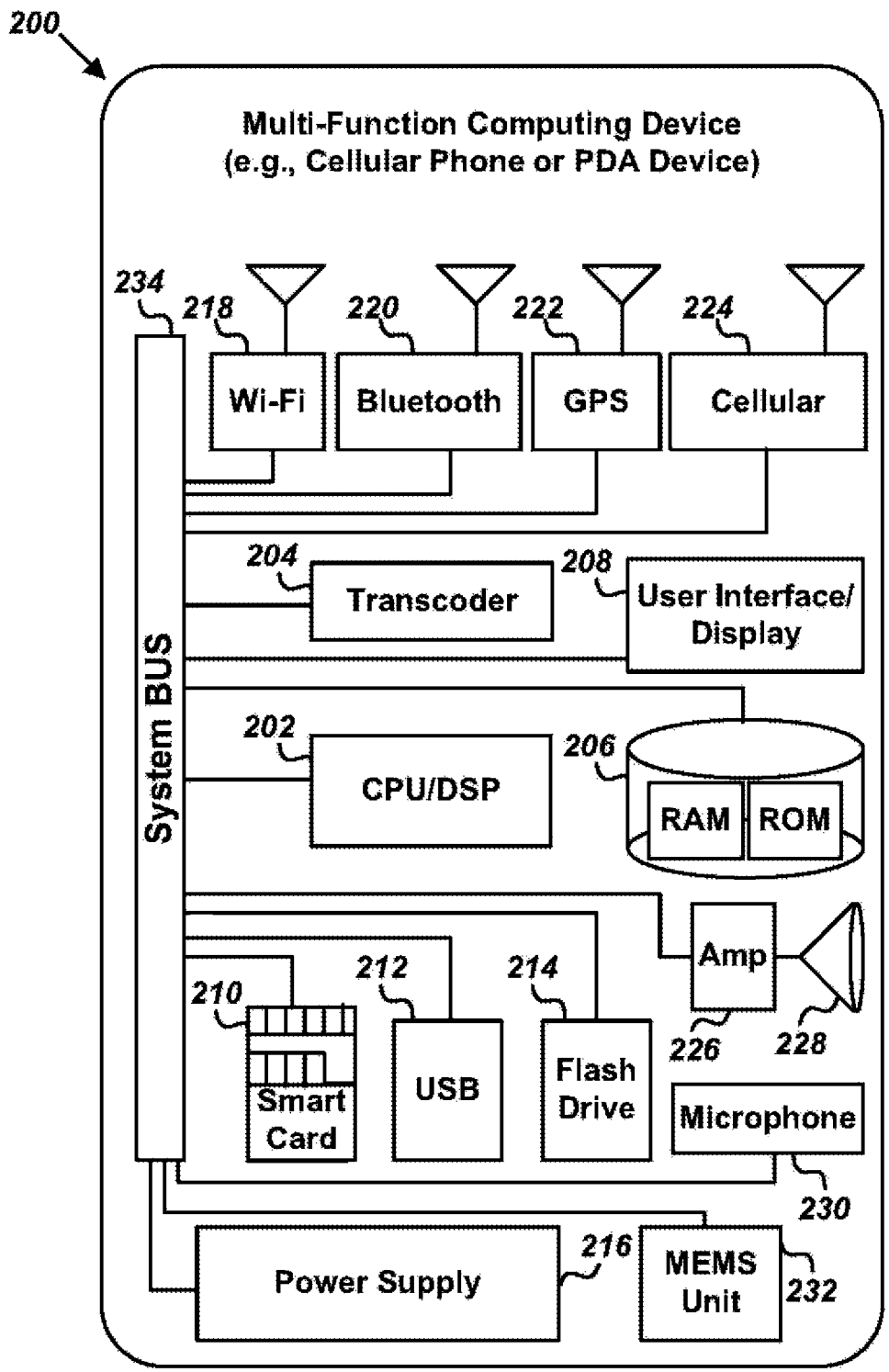
FIG. 2 illustrates a block diagram of a personal computing device associated with the Prior Art.
Figure 3:
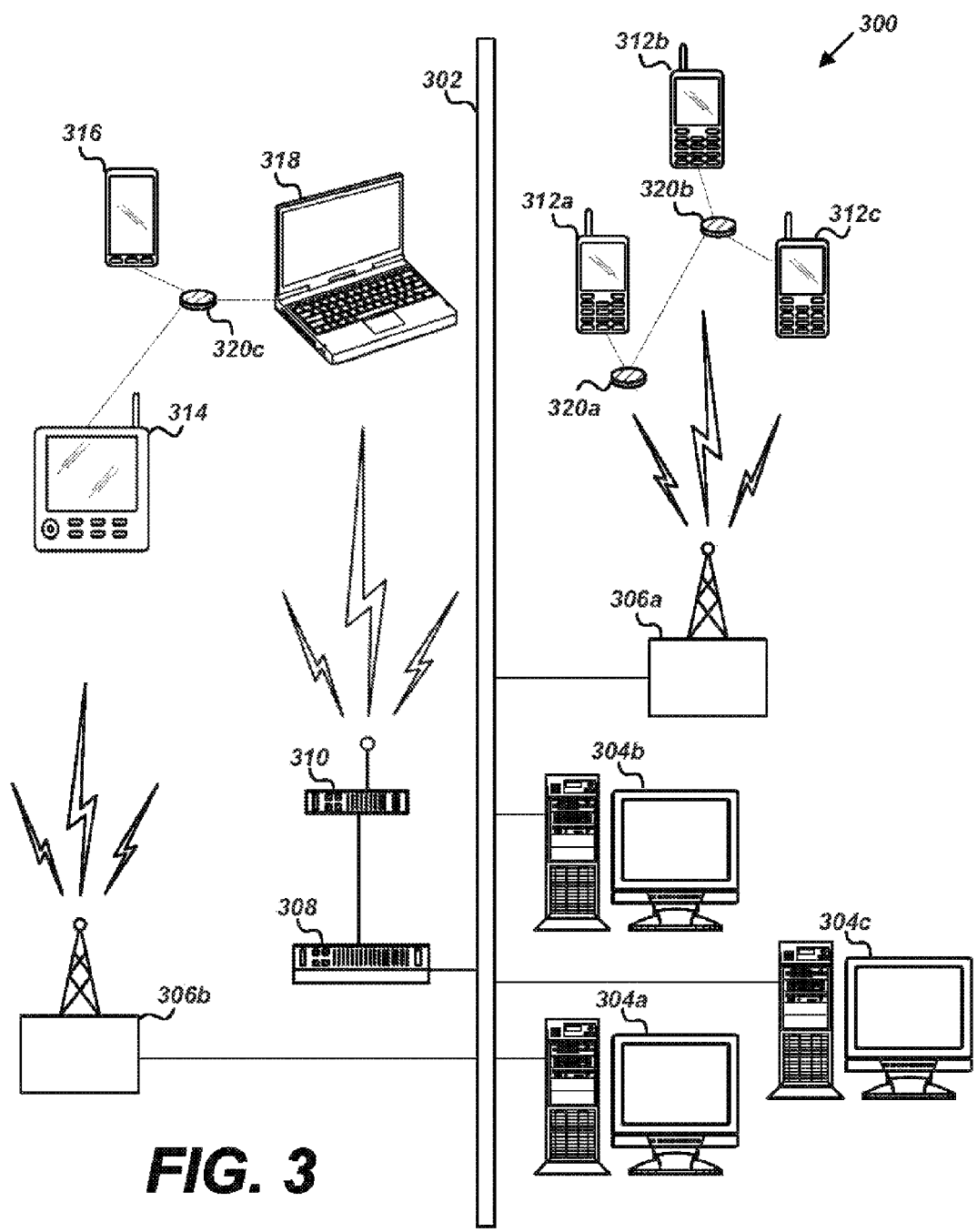
FIG. 3 illustrates a perspective view of a distributed computing system with multiple portable gateway devices in accordance with embodiments of the present invention.

In accordance with exemplary embodiments of the present invention, FIG. 3 illustrates a distributed computing system 300 including various wireline and wireless computing devices that may be utilized to implement any of the data communications processes associated with various embodiments of the present invention (e.g., processes associated with any of FIGS. 9-12). The distributed computing system 300 may include various personal computing devices (PCDs) 312*a-c*, 314, 316, and 318 having access to a service provider network 302 (e.g., including a backhaul) by communicating wirelessly with various server provider devices, including base stations 306*a-b*, and 310, as well as any number or router 308 or server and controller computing devices 304*a-c* common in the Art using various portable gateway devices 320*a-c* associated with embodiments of the present invention.

As would be understood by those skilled in the Art, in most digital communications networks, the backhaul portion of a data communications network 302 may include the intermediate, generally wireline, links between a backbone of the network, and the sub-networks or network base stations 306*a-b*, and 310, located at the periphery of the network. For example, user equipment (also referred to herein as PCDs) 312*a-c*, 314, 316, and 318 communicating with one or more network base stations 306*a-b*, and 310 may constitute a local sub-network. Whereas the network connection between any of the network base stations 306*a-b*, and 310 and the rest of the world initiates with a link to the backhaul portion of an access provider's communications network 302 (e.g., via a point of presence).

In an embodiment, any of the portable gateway devices 320*a-c*, and/or network base stations 306*a-b*, and 310 may function collaboratively to implement any of the shared network access processes associated with various embodiments of the present invention. Further, any of the shared network access processes may be carried out via any common communications technology known in the Art, such as those associated with modern Global Systems for Mobile (GSM), Universal Mobile Telecommunications System (UMTS), Long Term Evolution (LTE) network infrastructures, etc. In accordance with a standard GSM network, any of the service provider devices 304*a-c*, 306*a-b*, 308, 310 may be associated with a base station controller (BSC), a mobile switching center (MSC), or any other common service provider device known in the art, such as a radio resource manager (RRM). In accordance with a standard UMTS network, any of the service provider devices 304a-c, 306a-b, 308, 310 may be associated with a network resource controller (NRC), a serving GPRS support node (SGSN), or any other common service provider controller device known in the art, such as a radio resource manager (RRM). In accordance with a standard LTE network, any of the service provider devices 304a-c, 306a-b, 308, 310 may be associated with an eNodeB base station, a mobility management entity (MME), or any other common service provider controller device known in the art, such as a radio resource manager (RRM).

In an embodiment, any of the service provider devices 304a-c, 306a-b, 308, 310 as well as any of the PCDs 312a-c, 314, 316, and 318 may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, etc. In an embodiment, any of the service provider devices 304a-c, 306a-b, 308, 310 may employ any number of common server, desktop, laptop, and personal computing devices.

In an embodiment, any of the PCDs 312a-c, 314, 316, and 318 may be associated with any combination of common mobile computing devices (e.g., laptop computers, netbook computers, tablet computers, cellular phones, PDAs, handheld gaming units, electronic book devices, personal music players, video recorders, etc.), having wireless communications capabilities employing any common wireless data communications technology, including, but not limited to: GSM, UMTS, 3GPP LTE, LTE Advanced, WiFi, WiMAX, etc.

In an embodiment, the backhaul portion of the data communications network 302 of FIG. 3 may employ any of the following common communications technologies: optical fiber, coaxial cable, twisted pair cable, Ethernet cable, and powerline cable, along with any other wireless communication technology known in the art. In an embodiment, any of the service provider devices 304a-c, 306a-b, 308, 310 as well as any of the PCDs 312a-c, 314, 316, and 318 may include any standard computing software and hardware necessary for processing, storing, and communicating data amongst each other within the networked computing system 300. The computing hardware realized by any of the network computing system 300 devices (may include, but is not limited to: one or more processors, volatile and non-volatile memories, user interfaces, transcoders, modems, wireline and/or wireless communications transceivers, rechargeable power supplies, etc.

Further, any of the portable gateway devices 320a-c, service provider devices 304a-c, 306a-b, 308, 310, as well as any of the PCDs 312a-c, 314, 316, and 318 may include one or more computer-readable media (e.g., any common volatile or non-volatile memory type) encoded with a set of computer readable instructions, which when executed, can perform a portion of any of the shared network access processes associated with various embodiments of the present invention. In context with various embodiments of the present invention, it should be understood that wireless communications coverage associated with various data communication technologies (e.g., network base stations 106a-b, and 310) typically vary amongst different service provider networks based on the type of network and the system infrastructure deployed within a particular region of a network (e.g., differences amongst GSM, UMTS, LTE, LTE Advanced, WiFi and WiMAX based networks and the technologies deployed in each network type).

Figure 4:
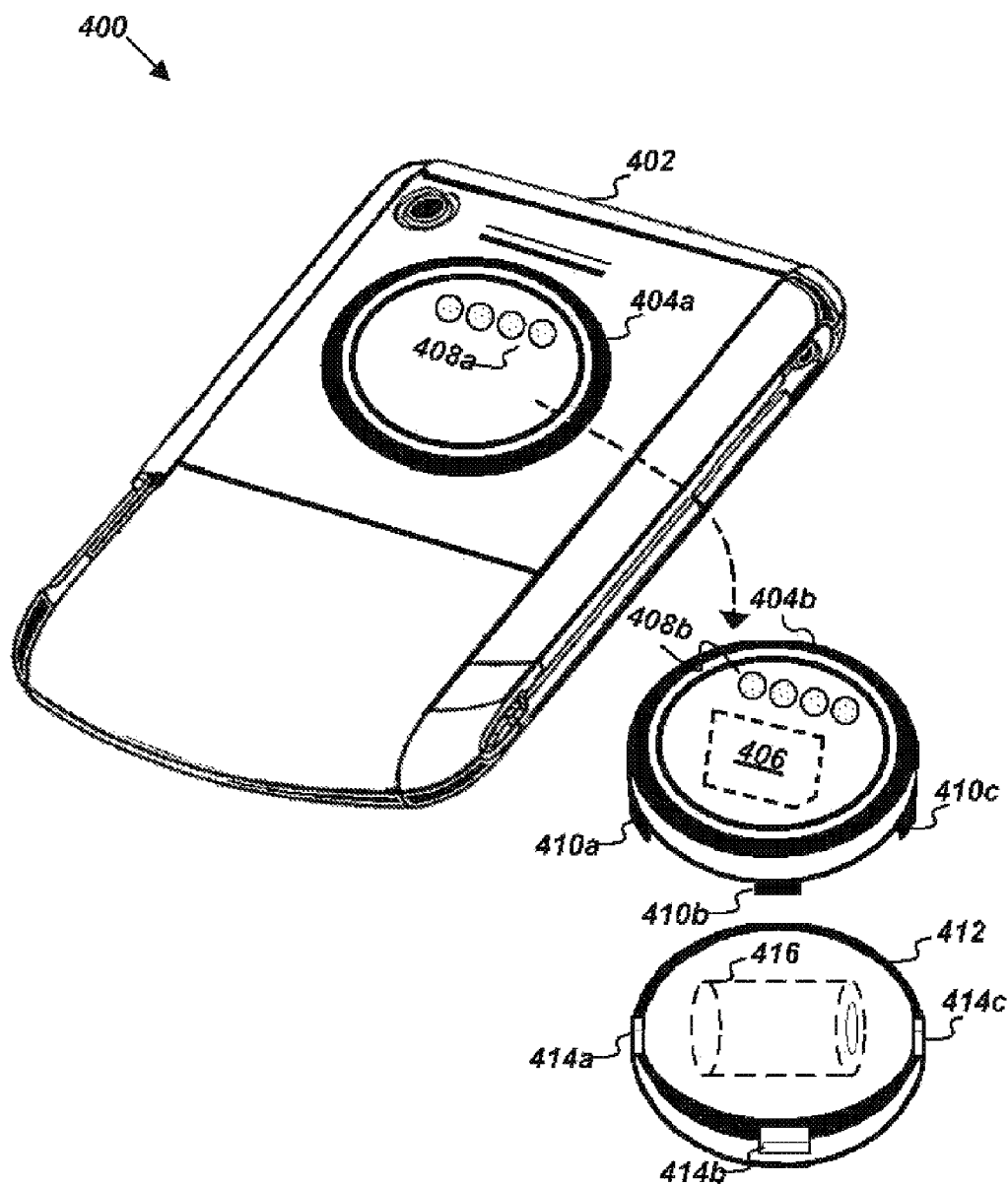
FIG. 4 illustrates a perspective view of a personal computing device with a removable portable gateway device and an attachable power supply component in accordance with an embodiment of the present invention.

FIG. 4 illustrates a perspective view 400 of a personal computing device 402 (e.g., a cellular phone or a PDA or any of the other PCDs 312a-c, 314, 316, and 318 of FIG. 3) and a removable portable gateway device 404a-b that has an optional, attachable power supply component 412 in accordance with an embodiment of the present invention. In an embodiment, the portable gateway device 404a-b and the power supply component 412 include all the hardware components depicted in the block diagram of FIG. 5. In an embodiment the portable gateway device 404a-b may be removed from the PCD 402 by pressing or turning the removable device 404a-b, such that it readily detaches from the PCD 402 without much effort on the part of a user. Subsequent to being removed from the PCD 402, the portable gateway device 404a-b may be joined with the power supply component 412 by pressing the two components together, such that they lock securely and act as a single autonomous device. In an embodiment, the autonomous portable gateway device 404a-b, 412 may be a snap fit device where peripheral components 410a-c of the portable gateway device 404a-b lock with peripheral recesses 414a-c of the power supply component 412, when joined. It should be understood that the portable gateway device 404a-b has an identity module embodied 406 therein and an optional array of indicator lights to signal power level and/or communications signal strength for communications with a neighboring base station (e.g., any of base stations 306a-b, and 310 of FIG. 3). It should also be understood that the power supply component 412 has a rechargeable battery component 416 (e.g., such as a rechargeable lithium ion battery) stored therein.

Figure 5:
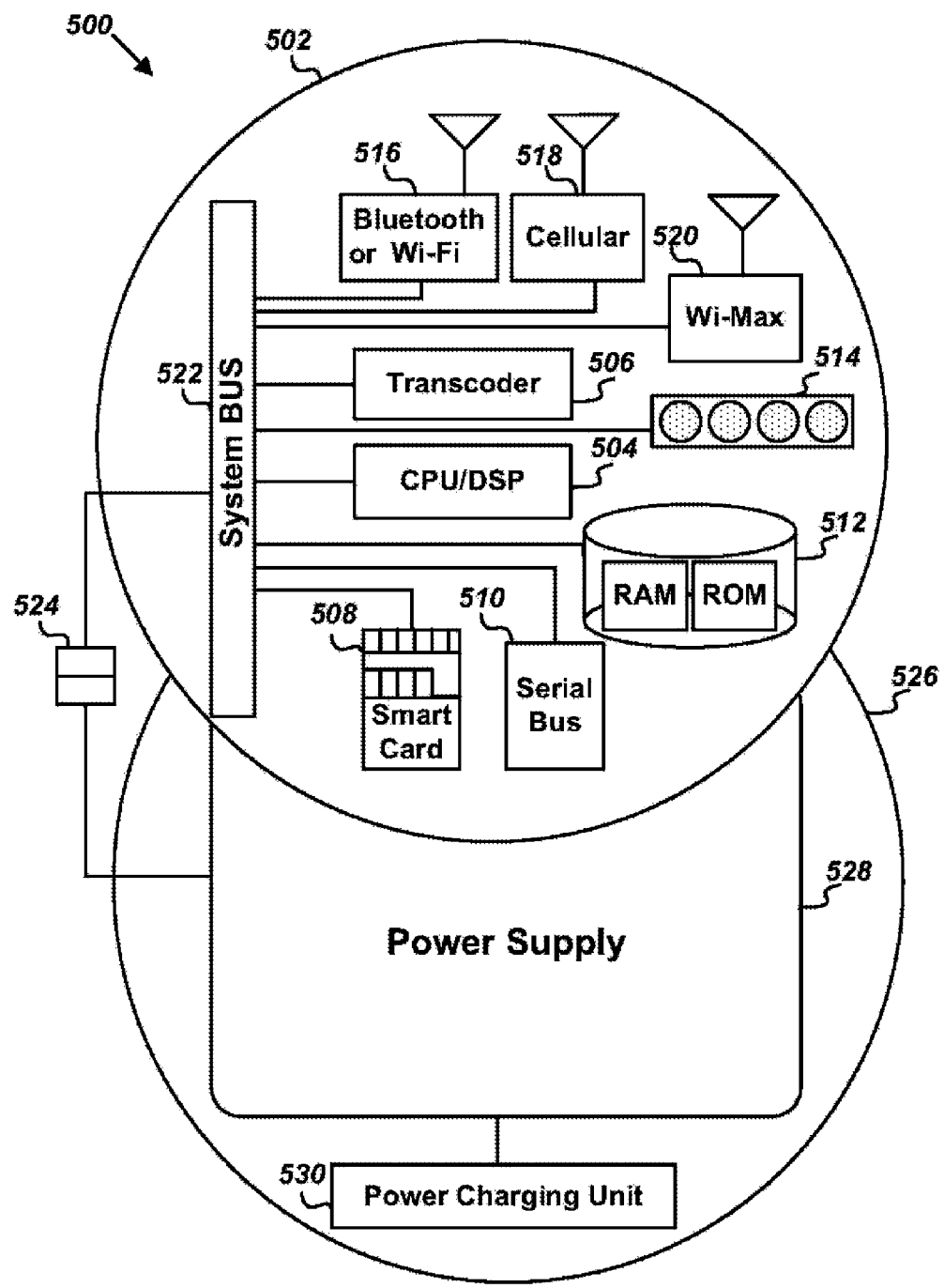
FIG. 5 illustrates a block diagram of a portable gateway device with an attachable power supply component (See e.g., FIG. 4) in accordance with an embodiment of the present invention.

FIG. 5 illustrates a block diagram 500 of a portable gateway device 502 with an attachable power supply component 526 (See e.g., FIG. 4) in accordance with an embodiment of the present invention. The portable gateway device may be representative of any of the portable gateway devices 320a-c depicted in FIG. 3. In an embodiment, the portable gateway device 502 may include, but is not limited to, the following components: a central processing/digital signal processing component 502, a transcoders 506, an identity module 508 (e.g., such as a smart card or SIM card), a serial bus 510, a system memory 512, an array of indicator lights 514, a short range communications transceiver 516 (i.e., such as a Bluetooth or a WiFi transceiver) and one or more long range transceiver components 518, 520 (i.e., such as a Cellular transceiver and/or a WiMAX transceiver), and a system bus 522 facilitating communication amongst all components of the portable gateway device 502.

In an embodiment, the CPU/DSP 504 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 504 may be responsible for executing all shared data communications and authentication software stored on the portable gateway device's 502 volatile (RAM) and non-volatile (ROM) system memories, 512. In an embodiment, the identity module 508 (e.g., such as a smart card or SIM card) may facilitate the portable gateway device's 502 authentication with a proprietary network service provider. In an embodiment, one or more users of local PCDs (e.g., any of PCDs 312a-c, 314, 316, and 318) may communicate with the portable gateway device's 502 short range communications transceiver 516 (i.e., such as a Bluetooth or a WiFi transceiver) to request individual and/or simultaneous access to a proprietary network service. In an embodiment, the portable gateway device 502 may authenticate one or more shared user access requests at the portable gateway device 502 and then submit/forward one or more data transfer requests (along with authentication information associated with the identity module 508) to a remote service provider device (e.g., any of base stations 306a-b, and 310 of FIG. 3) using a longer range transceiver component 518, 520 (i.e., such as a Cellular transceiver and/or a WiMAX transceiver). After authentication with a remote service provider device, the portable gateway device 502 may act as a relay/gateway between one or more PCDs (e.g., any of PCDs 312a-c, 314, 316, and 318) and a service provider device (e.g., any of base stations 306a-b, and 310) offering data communications services.

In an embodiment, the attachable power supply component 526 may include both a rechargeable power supply 528 (e.g., a lithium ion battery), a power charging unit 530 for allowing the attachable power supply component 526 to plug into a shore power source (not shown), and a connector 524 for connecting the attachable power supply component 526 to the portable gateway device 502.

Figure 6:
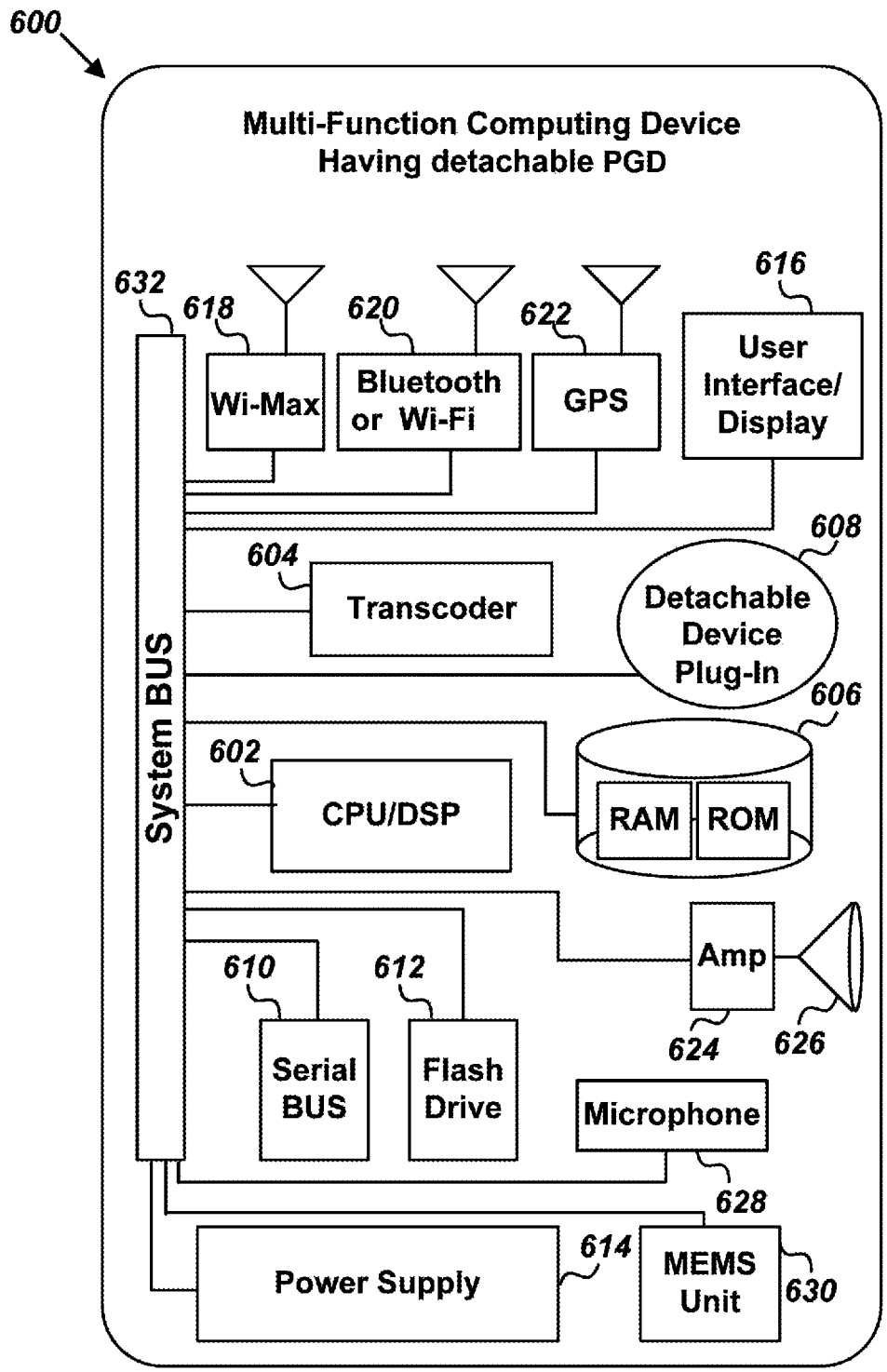
FIG. 6 illustrates a block diagram of a personal computing device having a detachable portable gateway device (See e.g., FIG. 4) in accordance with an embodiment of the present invention.

FIG. 6 illustrates a block diagram of a personal computing device 600 having a detachable portable gateway device (See e.g., FIG. 5) in accordance with an embodiment of the present invention. The PCD 600 may be representative of any of the PCDs 312a-c, 314, 316, and 318 depicted in FIG. 3. In an embodiment, the PCD 600 may include, but is not limited to, the following components: a central processing/digital signal processing component 602, a transcoder 604, a system memory 606, a detachable PGD plug-in component 608, a serial bus 610, a flash drive 612, a rechargeable power supply 614, a user interface/display 616, a short range communications transceiver 620 (i.e., such as a Bluetooth or a WiFi transceiver) and one or more longer range transceiver components 618, 622, (i.e., such as a WiMAX and/or a GPS transceiver), and audio amplifier 624, a speaker 626, a MEMS unit 630, and a system bus 632 facilitating communication amongst all components of the PCD 632.

In an embodiment, the CPU/DSP 602 may include an arithmetic logic unit (ALU, not shown) that performs arithmetic and logical operations and one or more control units (CUs, not shown) that extract instructions and stored content from memory 606 and then executes and/or processes them, calling on the ALU when necessary during program execution. The CPU/DSP 602 may be responsible for controlling data communications and executing software stored in the personal computing device's 600 memory 606.

Figure 7:
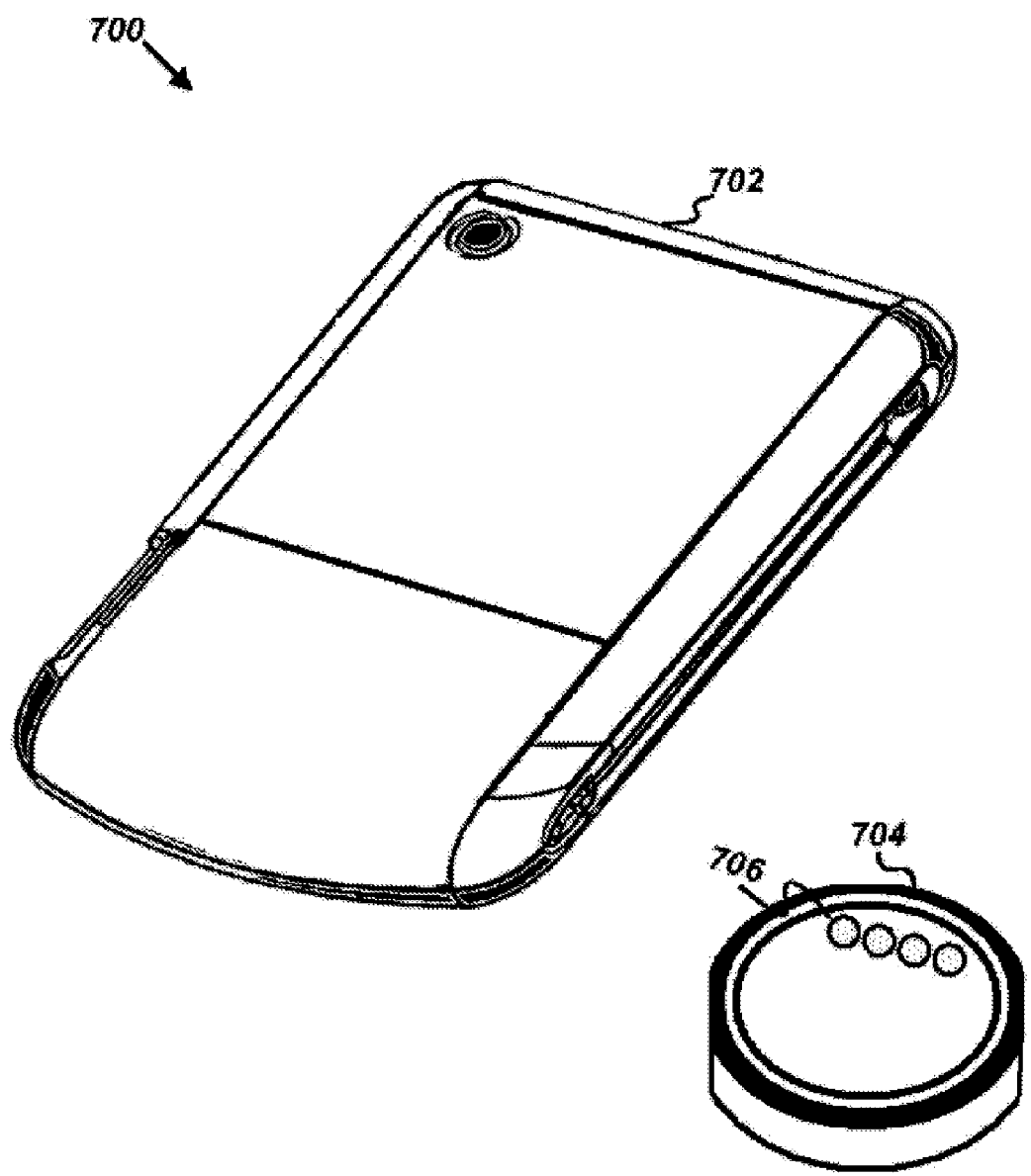
FIG. 7 illustrates a perspective view of a personal computing device located in proximity to an autonomous portable gateway device in accordance with an embodiment of the present invention.
Figure 8:
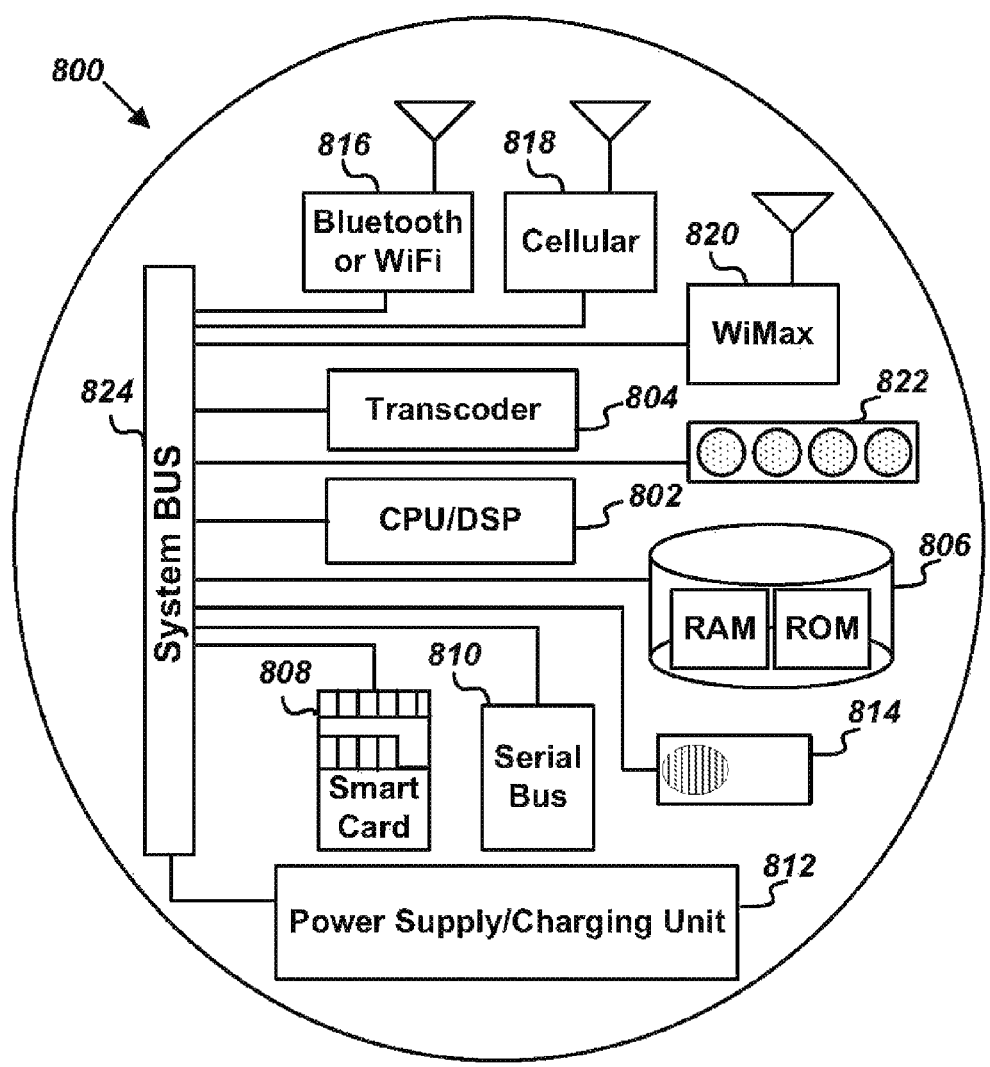
FIG. 8 illustrates a block diagram of an autonomous portable gateway device (See e.g., FIG. 7) in accordance with an embodiment of the present invention.

FIG. 8 illustrates a block diagram of an autonomous portable gateway device 800 (See e.g., 704 of FIG. 7) in accordance with an embodiment of the present invention. The autonomous PGD 800 may be representative of any of the portable gateway devices 320a-c depicted in FIG. 3. In an embodiment, the portable gateway device 800 may include, but is not limited to, the following components: a central processing/digital signal processing component 802, a transcoder 804, an identity module 808 (e.g., such as a smart card or SIM card), a serial bus 810, a system memory 806, an array of indicator lights 822, an ON/OFF switch 814, a power supply/charging unit 812, a short range communications transceiver 816 (i.e., such as a Bluetooth or a WiFi transceiver) and one or more long range transceiver components 818, 820 (i.e., such as a Cellular transceiver and/or a WiMAX transceiver), and a system bus 824 facilitating communication amongst all components of the autonomous PGD 800.

In an embodiment, the CPU/DSP 802 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 802 may be responsible for executing all shared data communications and authentication software stored on the autonomous PGD's 800 volatile (RAM) and non-volatile (ROM) system memories, 806. In an embodiment, the identity module 808 (e.g., such as a smart card or SIM card) may facilitate the autonomous PGD's 800 authentication with a proprietary network service provider. In an embodiment, one or more users of local PCDs (e.g., any of PCDs 312a-c, 314, 316, and 318) may communicate with the autonomous PGD's 800 short range communications transceiver 816 (i.e., such as a Bluetooth or a WiFi transceiver) to request individual and/or simultaneous access to a proprietary network service. In an embodiment, the autonomous PGD 800 may authenticate one or more shared user access requests at the autonomous PGD 800 and then submit/forward one or more data transfer requests (along with authentication information associated with the identity module 808) to a remote service provider device (e.g., any of base stations 306a-b, and 310 of FIG. 3) using a longer range transceiver component 818, 820 (i.e., such as a Cellular transceiver and/or a WiMAX transceiver). After authentication with a remote service provider device, the autonomous PGD 800 may act as a relay/gateway between one or more PCDs (e.g., any of PCDs 312a-c, 314, 316, and 318) and a service provider device (e.g., any of base stations 306a-b, and 310) offering data communications services.

Figure 9:
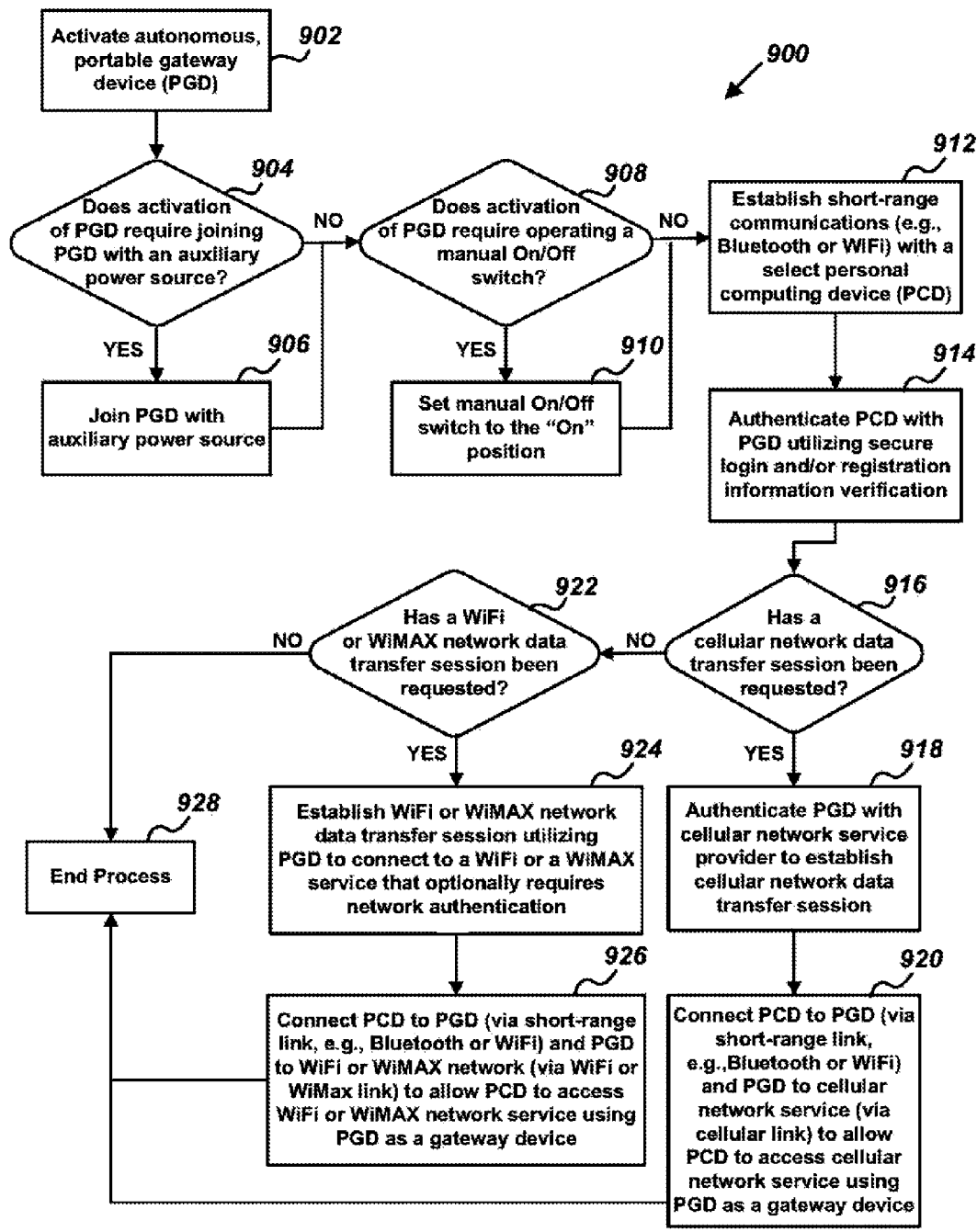
FIG. 9 illustrates a flow diagram of a process that utilizes a portable gateway device to access proprietary network services (e.g., those associated with WiFi, WiMAX, and 3G or 4G cellular networks) in accordance with embodiments of the present invention.

FIG. 9 illustrates a flow diagram 900 of a process that utilizes a portable gateway device to access proprietary network services (e.g., those associated with WiFi, WiMAX, and 3G or 4G cellular networks) in accordance with embodiments of the present invention. It should be understood that these processes 900 may be executed independently or collectively using one or more computer-executable programs stored on computer-readable media located on one or more PCDs (e.g., any of PCDs 312a-c, 314, 316, and 318), a PGD (e.g., any of PGDs 320a-c) and network service provider devices (e.g., any of network base stations 306a-b, and 310). The process 900 is comprised of flow diagram steps 902, 904, 906, 908, 910, 912, 914, 916, 918, 920, 922, 924, 926, and 928. Process 900 is depicted/described in sufficient textual and illustrative detail to facilitate understanding by one of ordinary skill in the Art reviewing FIG. 9 in combination with FIGS. 3-8.

Figure 10:
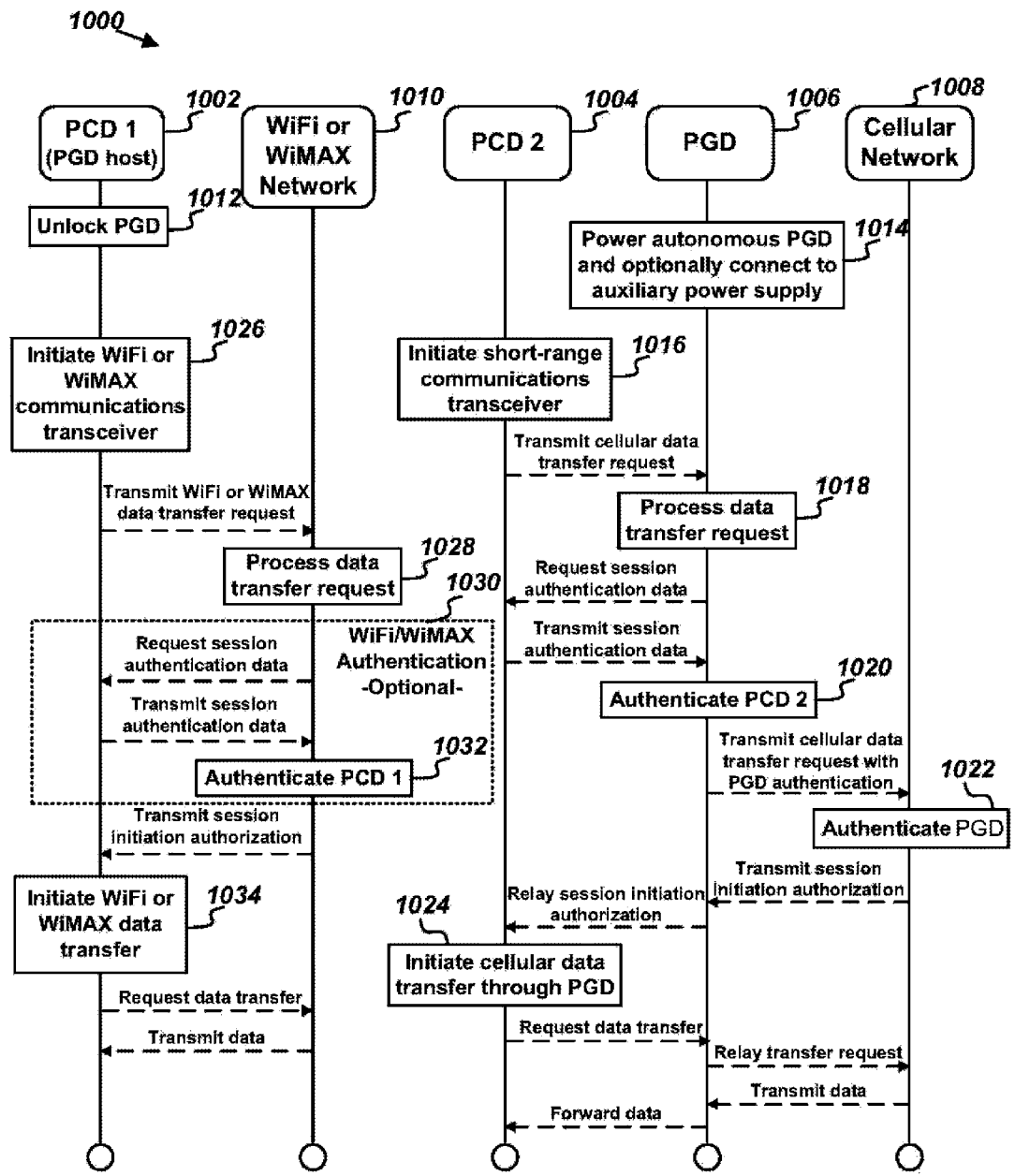
FIG. 10 illustrates a communication flow diagram of processes where multiple personal computing devices simultaneously access separate networks in accordance with an embodiment of the present invention.

FIG. 10 illustrates a communication flow diagram of process 1000 where multiple personal computing devices simultaneously access separate networks (e.g., WiFi, WiMAX, and/or 3G or 4G Cellular networks) in accordance with an embodiment of the present invention. In an embodiment, the system includes a first PCD1 1002 (e.g., optionally, a PGD host, See e.g., FIG. 4), a second PGD2 1004, a PGD 1006, a WiFi or WiMAX network 1010, and a cellular network 1008. It should be understood that these process 1000 may be executed independently or collectively using one or more computer-executable programs stored on computer-readable media located on one or more PCDs (e.g., any of PCDs 312a-c, 314, 316, and 318), a PGD (e.g., any of PGDs 320a-c) and network service provider devices (e.g., any of network base stations 306a-b, and 310). The process 1000 is comprised of flow diagram steps 1012, 1014, 1016, 1018, 1020, 1022, 1024, 1026, 1028, 1030, 1032, and 1034. Process 1000 is depicted/described in sufficient textual and illustrative detail to facilitate understanding by one of ordinary skill in the Art reviewing FIG. 10 in combination with FIGS. 3-8.

Figure 11:
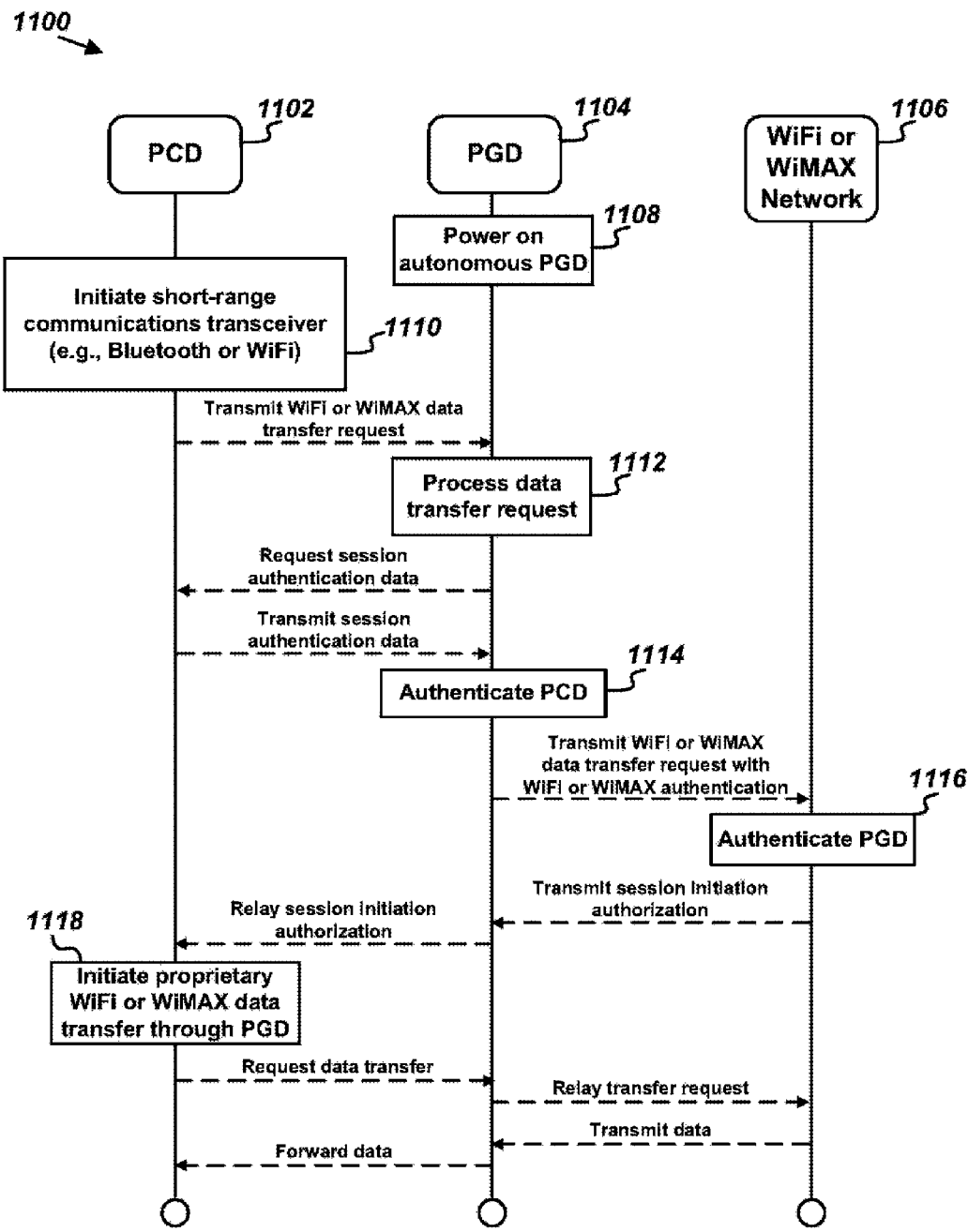
FIG. 11 illustrates a communication flow diagram of a process where a personal computing device accesses a proprietary WiFi or WiMAX network using a portable gateway device in accordance with embodiments of the present invention.

FIG. 11 illustrates a communication flow diagram of a process 1100 where a personal computing device accesses a proprietary WiFi or WiMAX network using a portable gateway device in accordance with embodiments of the present invention. In an embodiment, the system includes a first PCD 1102, a PGD 1104, and a WiFi or WiMAX network 1106. It should be understood that this process 1100 may be executed independently or collectively using one or more computer-executable programs stored on computer-readable media located on one or more PCDs (e.g., any of PCDs 312a-c, 314, 316, and 318), a PGD (e.g., any of PGDs 320a-c) and network service provider devices (e.g., any of network base stations 306a-b, and 310). The process 1100 is comprised of flow diagram steps 1108, 1110, 1112, 1114, 1116, and 1118. Process 1100 is depicted/described in sufficient textual and illustrative detail to facilitate understanding by one of ordinary skill in the Art reviewing FIG. 11 in combination with FIGS. 3-8.

Figure 12:
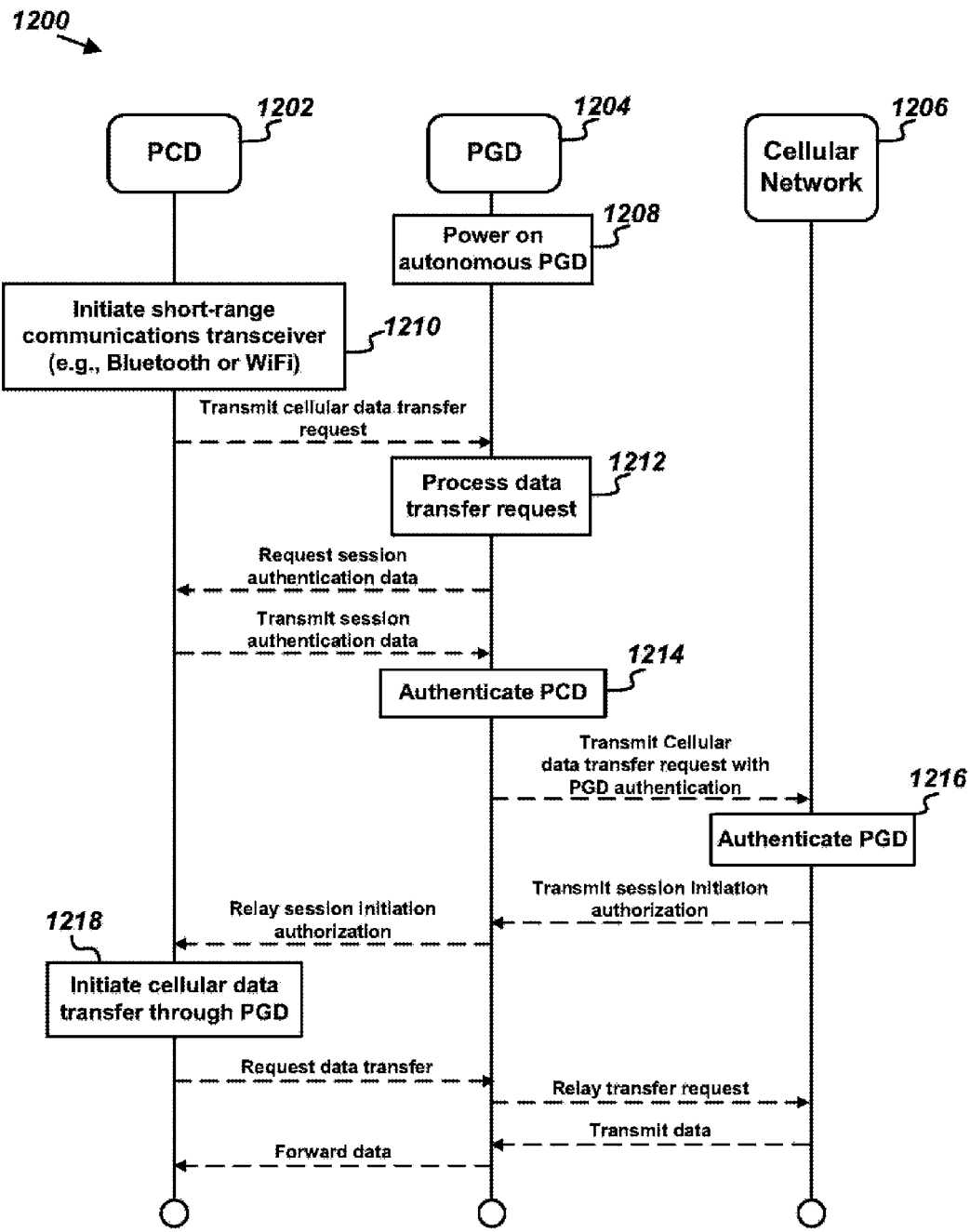
FIG. 12 illustrates a communication flow diagram of a process where a personal computing device accesses a proprietary cellular network using a portable gateway device in accordance with embodiments of the present invention.

FIG. 12 illustrates a communication flow diagram of a process 1200 where a personal computing device accesses a proprietary cellular network using a portable gateway device in accordance with embodiments of the present invention. In an embodiment, the system includes a first PCD 1202, a PGD 1204, and a 3G or 4G Cellular network 1206. It should be understood that this process 1200 may be executed independently or collectively using one or more computer-executable programs stored on computer-readable media located on one or more PCDs (e.g., any of PCDs 312a-c, 314, 316, and 318), a PGD (e.g., any of PGDs 320a-c) and network service provider devices (e.g., any of network base stations 306a-b, and 310). The process 1200 is comprised of flow diagram steps 1208, 1210, 1212, 1214, 1216, and 1218. Process 1200 is depicted/described in sufficient textual and illustrative detail to facilitate understanding by one of ordinary skill in the Art reviewing FIG. 12 in combination with FIGS. 3-8.

While several embodiments of the present invention have been illustrated and described herein, many changes can be made without departing from the spirit and scope of the invention.

The embodiments of the invention in which an exclusive property or privilege is claimed are defined as follows:

1. A portable gateway device facilitating enabling shared access to a proprietary wireless communications network, the portable gateway device comprising:
   a local power supply;
   at least one processor;
   at least one memory;
   an identification module associated with a proprietary wireless network;
   a first wireless communications component; and
   a second wireless communications component having longer range communications capability than the first wireless communications component,
   wherein the portable gateway device enables one or more external computing device accessing the proprietary wireless network by:
      establishing communications with a first external computing device using the first wireless communications component;
      authenticating access with the proprietary wireless network using the second wireless communications component; and
      relaying communications between the first external computing device and the proprietary wireless network using the first wireless communications component and the second wireless communications component, and
   wherein the portable gateway device enables a second external computing device accessing the proprietary wireless network at the same time the first external computing device accesses the proprietary wireless network.

2. The portable gateway device of claim 1, wherein the second wireless communications component has WiMAX or cellular communications capability, and wherein the first wireless communications component has WiFi or Bluetooth communications capability.

3. The portable gateway device of claim 1, wherein the portable gateway device is further configured to enable simultaneous data transfers for the first external computing device and the second external computing device by allocating available bandwidth access with the proprietary wireless network to the first external computing device and the second external computing device equally.

4. The portable gateway device of claim 1, wherein the portable gateway device is further configured to enable simultaneous data transfers for the first external computing device and the second external computing device by allocating available bandwidth access with the proprietary wireless network to the first external computing device and the second external computing device in accordance with a predefined set of data transfer prioritization rules.

5. The portable gateway device of claim 1, wherein the portable gateway device authenticates access for the first external computing device using the first wireless communications component, before authenticating access with the proprietary wireless network using the second wireless communications component.

6. The portable gateway device of claim 1, wherein a user of the first external computing device is prompted for approval prior to allowing the second external computing device shared access to the proprietary wireless network.

7. A non-transitory computer-readable medium encoded with computer-executable instructions that enable shared access to a proprietary wireless communications network, which when executed by one or more processors, are operable to:
   initiate a portable gateway device comprising an identification module associated with a proprietary wireless network;
   establish communications between a first external computing device and the portable gateway device using a first wireless communications component of the portable gateway device;
   authenticate access to the proprietary wireless network using a second wireless communications component of the portable gateway device, the second wireless communications component having longer range communications capability than the first wireless communications component; and
   relay communications between the first external computing device and the proprietary wireless network using the first wireless communications component and the second wireless communications component,
   wherein the portable gateway device enables a second external computing device to access the proprietary wireless network at the same time the first external computing device accesses the proprietary wireless network.

8. The non-transitory computer-readable medium of claim 7, wherein the second wireless communications component has WiMAX or cellular communications capability, and wherein the first wireless communications component has WiFi or Bluetooth communications capability.

9. The non-transitory computer-readable medium of claim 7, encoded with computer-executable instructions, which when executed by the one or more processors, are further operable to authenticate access for the first external computing device using the first wireless communications component, before authenticating access with the proprietary wireless network using the second wireless communications component.

10. The non-transitory computer-readable medium of claim 7, encoded with computer-executable instructions, which when executed by the one or more processors, are further operable to prompt a user of the first external computing device for approval prior to allowing the second external computing device shared access to the proprietary wireless network.

11. The non-transitory computer-readable medium of claim 7, encoded with computer-executable instructions, which when executed by the one or more processors, are further operable to enable simultaneous data transfers for the first external computing device and the second external computing device by allocating available bandwidth access with the proprietary wireless network to the first external computing device and the second external computing device, equally.

12. The non-transitory computer-readable medium of claim 7, encoded with computer-executable instructions, which when executed by the one or more processors, are further operable to enable simultaneous data transfers for the first external computing device and the second external computing device by allocating available bandwidth access with the proprietary wireless network to the first external computing device and the second external computing device, in accordance with a predefined set of data transfer prioritization rules.

13. A computer-implemented method enabling shared access to a proprietary wireless communications network, the method comprising:
   initiating a portable gateway device comprising an identification module associated with a proprietary wireless network;
   establishing communications between a first external computing device and the portable gateway device using a first wireless communications component of the portable gateway device;
   authenticating access to the proprietary wireless network using a second wireless communications component of the portable gateway device, the second wireless communications component having longer range communications capability than the first wireless communications component; and
   relaying communications between the first external computing device and the proprietary wireless network using the first wireless communications component and the second wireless communications component,
   wherein the portable gateway device enables a second external computing device to access the proprietary wireless network at the same time the first external computing device accesses the proprietary wireless network.

14. The computer-implemented method of claim 13, wherein the second wireless communications component has WiMAX or cellular communications capability, and wherein the first wireless communications component has WiFi or Bluetooth communications capability.

15. The computer-implemented method of claim 13, further comprising authenticating access for the first external computing device using the first wireless communications component, before authenticating access with the proprietary wireless network using the second wireless communications component.

16. The computer-implemented method of claim 13, further comprising prompting a user of the first external computing device for approval prior to allowing the second external computing device shared access to the proprietary wireless network.

17. The computer-implemented method of claim 13, further comprising enabling simultaneous data transfers for the first external computing device and the second external computing device by allocating available bandwidth access with the proprietary wireless network to the first external computing device and the second external computing device, equally.

18. The computer-implemented method of claim 13, further comprising enabling simultaneous data transfers for the first external computing device and the second external computing device by allocating available bandwidth access with the proprietary wireless network to the first external computing device and the second external computing device, in accordance with a predefined set of data transfer prioritization rules.

* * * * *

UNITED STATES PATENT AND TRADEMARK OFFICE
CERTIFICATE OF CORRECTION

PATENT NO. : 8,488,541 B2
APPLICATION NO. : 12/910781
DATED : July 16, 2013
INVENTOR(S) : Scott Allen Schlack It is certified that error appears in the above-identified patent and that said Letters Patent is hereby corrected as shown below:

In the Claims:

Column 13, claim 1, line 38, currently reads as follows: "1. A protable gateway device facilitating enabling shared access...."

Column 13, claim 1, line 38, should read: "1. A portable gateway device enabling shared access...,"

Signed and Sealed this
Twenty-ninth Day of October, 2013

Teresa Stanek Rea
*Deputy Director of the United States Patent and Trademark Office*